(12) United States Patent
Bapat et al.

(10) Patent No.: US 10,305,418 B2
(45) Date of Patent: May 28, 2019

(54) TORQUE TUBE COUPLER

(71) Applicant: SUNPOWER CORPORATION, San Jose, CA (US)

(72) Inventors: Sushrut Bapat, Alameda, CA (US); Tyler Grushkowitz, Hayward, CA (US); Nicholas James McKibben, Oakland, CA (US); Brian Wares, San Francisco, CA (US)

(73) Assignee: SunPower Corporation, San Jose, CA (US)

( * ) Notice: Subject to any disclaimer, the term of this patent is extended or adjusted under 35 U.S.C. 154(b) by 145 days.

(21) Appl. No.: 15/254,971

(22) Filed: Sep. 1, 2016

(65) Prior Publication Data
US 2018/0062563 A1 Mar. 1, 2018

(51) Int. Cl.
| | | |
|---|---|---|
| *H01L 31/042* | (2014.01) | |
| *H02N 6/00* | (2006.01) | |
| *H02S 20/32* | (2014.01) | |
| *H02S 20/10* | (2014.01) | |
| *H02S 20/23* | (2014.01) | |
| *F16D 1/04* | (2006.01) | |

(52) U.S. Cl.
CPC ............... *H02S 20/32* (2014.12); *F16D 1/04* (2013.01); *H02S 20/10* (2014.12); *H02S 20/23* (2014.12); *Y02B 10/12* (2013.01)

(58) Field of Classification Search
CPC .................................... H02S 20/32; F16D 1/06
See application file for complete search history.

(56) References Cited

U.S. PATENT DOCUMENTS

| | | |
|---|---|---|
| 9,279,457 B2 | 3/2016 | Grushkowitz |
| 9,395,104 B2 | 7/2016 | Grushkowitz |
| 2006/0044511 A1* | 3/2006 | Mackamul ............. F16M 11/10 353/3 |
| 2008/0251115 A1 | 10/2008 | Thompson et al. |
| 2010/0101625 A1* | 4/2010 | Kats ........................ H02S 20/32 136/244 |
| 2011/0023940 A1* | 2/2011 | Do .......................... H02S 20/00 136/246 |
| 2012/0216852 A1 | 8/2012 | Almy et al. |
| 2014/0053825 A1 | 2/2014 | Zhou |
| 2014/0090637 A1 | 4/2014 | Grushkowitz |
| 2014/0182577 A1 | 7/2014 | Linderman et al. |
| 2014/0270930 A1 | 9/2014 | Grushkowitz |

(Continued)

FOREIGN PATENT DOCUMENTS

WO 2016094864 A1 6/2016

OTHER PUBLICATIONS

International Search Report and Written Opinion from PCT/US2017/048487 dated Dec. 5, 2017, 14 pgs.

(Continued)

*Primary Examiner* — Angelo Trivisonno
(74) *Attorney, Agent, or Firm* — Schwabe, Williamson & Wyatt, P.C.

(57) ABSTRACT

A solar-tracking photovoltaic (PV) system having several PV modules mounted on a torque tube is described. The torque tube may include several sections joined by a torque tube coupler. For example, the torque tube coupler may having a medial section and end sections to join to the torque tube sections. The medial section and the torque tube sections may have a same outer diameter.

7 Claims, 13 Drawing Sheets

(56) References Cited

U.S. PATENT DOCUMENTS

2015/0027512 A1    1/2015   Fischer
2016/0195303 A1    7/2016   Lambert et al.

OTHER PUBLICATIONS

"GameChange Solar Repowering the Planet, Genius Tracker™, Changing the Game for Single Axis Solar Trackers", http://www.gamechangesolar.com/tracker, 2016, 10 pages.

U.S. Appl. No. 15/081,320, filed Mar. 25, 2016, titled "Sun Tracking Solar Energy Collection System and Method of Assembly", by inventor Brian Wares, 33 pages (specification and drawings).

\* cited by examiner

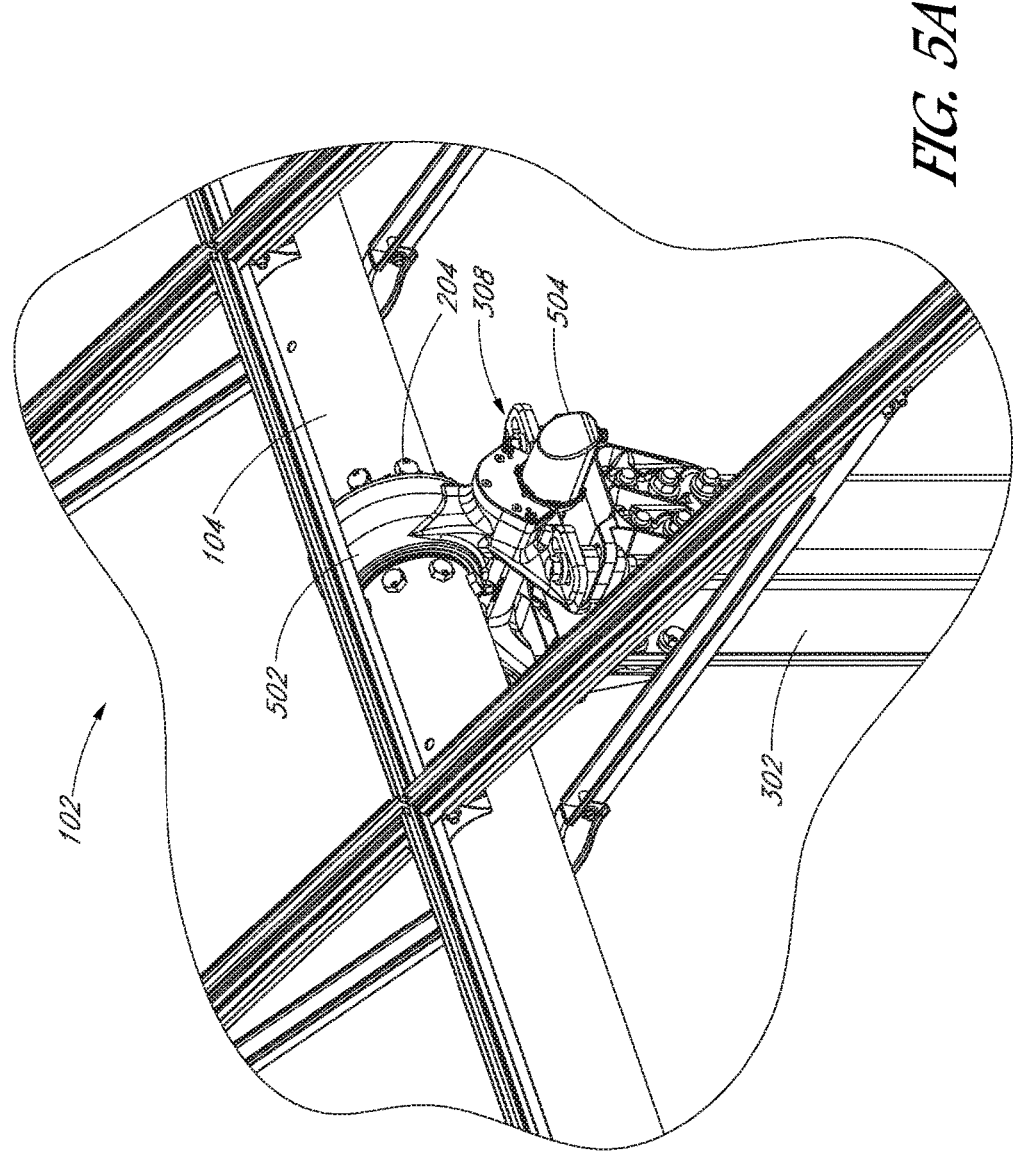

TORQUE TUBE COUPLER

BACKGROUND

Some sun-tracking solar power systems, such as utility-scale photovoltaic installations, are designed to pivot a large number of solar modules to track the movement of the sun. For example, sun-tracking solar power systems may include rows of solar modules supported on respective torque tube assemblies. Each torque tube assembly may include several long shafts connected together in an end-to-end fashion. Furthermore, each torque tube assembly may be moved by a single motor, controlled by a dedicated controller. A sun-tracking solar power system may be a single-drive sun-tracking solar power system.

BRIEF DESCRIPTION OF THE DRAWINGS

FIG. 5A illustrates a perspective view of a motor drive of a driven support assembly, in accordance with an embodiment of the present disclosure.

DETAILED DESCRIPTION

Figure 1:
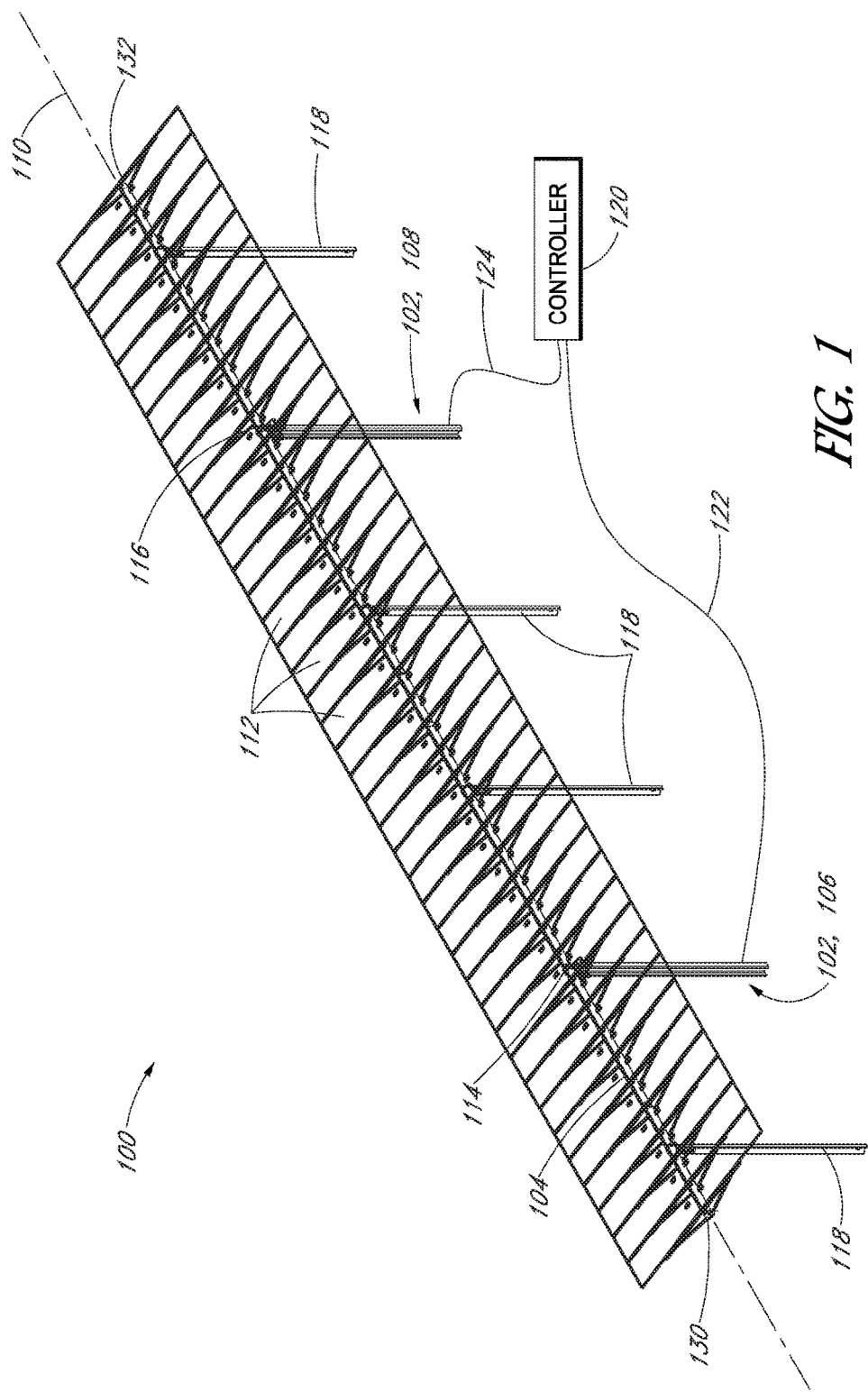
FIG. 1 illustrates a perspective view of a multi-drive solar-tracking photovoltaic (PV) system, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" motor drive does not necessarily imply that this motor drive is the first motor drive in a sequence; instead the term "first" is used to differentiate this motor drive from another motor drive (e.g., a "second" motor drive).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar energy collection installations, the disclosed techniques and structures apply equally to other solar energy collection installations, e.g., rooftop solar installations.

Existing single-drive sun-tracking solar power systems use a single motor to rotate an end of a torque tube assembly to transmit torque to an opposite end of the torque tube assembly. A single motor may also be used to rotate a center location of a torque tube assembly to transmit torque to a longitudinal separated location. An overall torsional stiffness of such systems is therefore governed in part by a length of the torque tube assembly, and the length can be on a scale of one hundred feet or more. PV modules mounted on the torque tube assembly may experience high wind loads that can excite a structure of the solar power system. More particularly, winds may apply drag to the PV modules, which can twist the torque tube. Such twisting is a function of the torque tube stiffness, and thus, single-drive systems may fail unless torque tube lengths are minimized or torque tube sizes, e.g., wall thicknesses, are maximized to increase stiffness. Decreasing torque tube lengths reduces a potential energy collection of the system, however, and increasing torque tube size increases system cost. Accordingly, single-drive sun-tracking solar power systems have substantial system limitations.

In an aspect, a multi-drive solar-tracking PV system includes several drives inputting torque to a same torque tube at longitudinally separated locations. More particularly, the drives may be separated by a distance such that a span between driven supports maintains a system stiffness above a predetermined threshold. For example, the span between drives may be less than one hundred feet between adjacent drives of the system. Accordingly, a span between ends of a torque tube section may be effectively reduced to avoid wind excitation, e.g., by winds with speeds up to ninety miles per hour.

In an aspect, a torque tube assembly of a multi-drive solar-tracking PV system includes several torque tube segments coupled by an intermediate torque tube coupler. Each torque tube segment may have an overall length less than 40 feet (12 meters), such that the torque tube segments are transportable in standard shipping containers. Furthermore, the torque tube coupler may have a closed wall section profile, such that torsion and bending stresses are distributed throughout the cross-sectional area, and the torque tube assembly robustly transmits torque between torque tube segments.

The aspects described above may be realized by the multi-drive solar-tracking PV system disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of actuators or techniques for coupling such actuators with system components, are not described in detail in order to not unnecessarily obscure embodiments of the present disclosure. Furthermore, it is to be understood that the various embodiments shown in the figures are illustrative representations and are not necessarily drawn to scale.

By way of summary, disclosed herein is a solar-tracking PV system having a torque tube assembly including a first torque tube segment coupled to a second torque tube segment by a torque tube coupler. The torque tube coupler may extend along a longitudinal axis between end sections that are coupled to respective free ends of the torque tube segments. In an embodiment, an outer diameter of a medial section of the torque tube coupler is a same diameter as respective outer diameters of the torque tube segments. Accordingly, PV modules may be mounted on the torque tube segments and the torque tube coupler using the same fastening hardware, and the torque tube coupler may transmit torque between the torque tube segments.

Referring to FIG. 1, a perspective view of a multi-drive solar-tracking PV system is shown in accordance with an embodiment of the present disclosure. An electricity farm may include one or more solar-tracking PV systems 100. Solar-tracking PV system 100 may be considered a multi-drive system because several motor drives may be coupled to a same torque tube to input torque to the torque tube at longitudinally separated locations. For example, solar-tracking PV system 100 may be a dual-drive system having a pair of motor drives coupled to respective ends of the same torque tube 104, or torque tube section. In an embodiment, solar-tracking PV system 100 includes several driven support assemblies 102 supporting a torque tube 104 above the ground at the longitudinally separated locations. For example, solar-tracking PV system 100 may include a first driven support assembly 106 longitudinally separated from a second driven support assembly 108 in a direction of a longitudinal axis 110.

Several PV modules 112 may be mounted on torque tube 104 along longitudinal axis 110. For example, solar-tracking PV system 100 may include a row of tens of solar modules arranged in a series. The series may include, for example, 70-100 PV modules 112 between a first outward end 130 and a second outward end 132. Each PV module 112 may include one or more solar collecting devices. For example, each PV module 112 may include a PV laminate mounted on a PV frame. The PV laminates may be configured to receive sunlight for conversion into electrical energy. For example, the PV laminates may include one or more PV cells laminated between an optically transparent upper cover and/or back cover.

Each PV frame may support a respective PV laminate along an outer perimeter and/or a back surface of the laminate structure. The PV frame may be mounted on torque tube 104 using mounting holes in the torque tube 104 components, as described below.

In an embodiment, torque tube 104 is supported above the ground by one or more non-driven support assemblies 118. For example, a non-driven support assembly 118 may be positioned longitudinally between first driven support assembly 106 and second driven support assembly 108. Each non-driven support assembly 118 along longitudinal axis 110 of torque tube 104 may support and allow for rotation of torque tube 104 about the longitudinal axis 110 without inputting torque to torque tube 104. Thus, non-driven support assemblies 118 may facilitate a stable rotation of torque tube 104 without actually driving such rotation.

Driven support assemblies may affect rotation of torque tube 104 about longitudinal axis 110 based on electrical inputs provided or controlled by a controller 120. Controller 120 may include a microprocessor or computer configured to control the delivery of electrical power to motors of driven support assemblies along torque tube 104. For example, controller 120 may directly or indirectly, e.g., through control of a power supply, deliver a first electrical power input 122 to first driven support assembly 106 and a second electrical power input 124 to second driven support assembly 108. Accordingly, the motors and/or mechanical transmission components of the driven support assemblies may be simultaneously controlled by controller 120 to input torque to first end 114 and second end 116 of a section of torque tube 104. More particularly, driven support assemblies may apply the torque to first end 114 and second end 116 about longitudinal axis 110. Thus, torque tube 104 may pivot or rotate about longitudinal axis 110 such that PV modules 112 track a solar source, e.g., the sun or a reflective surface redirecting sunrays toward PV modules 112.

Figure 2:
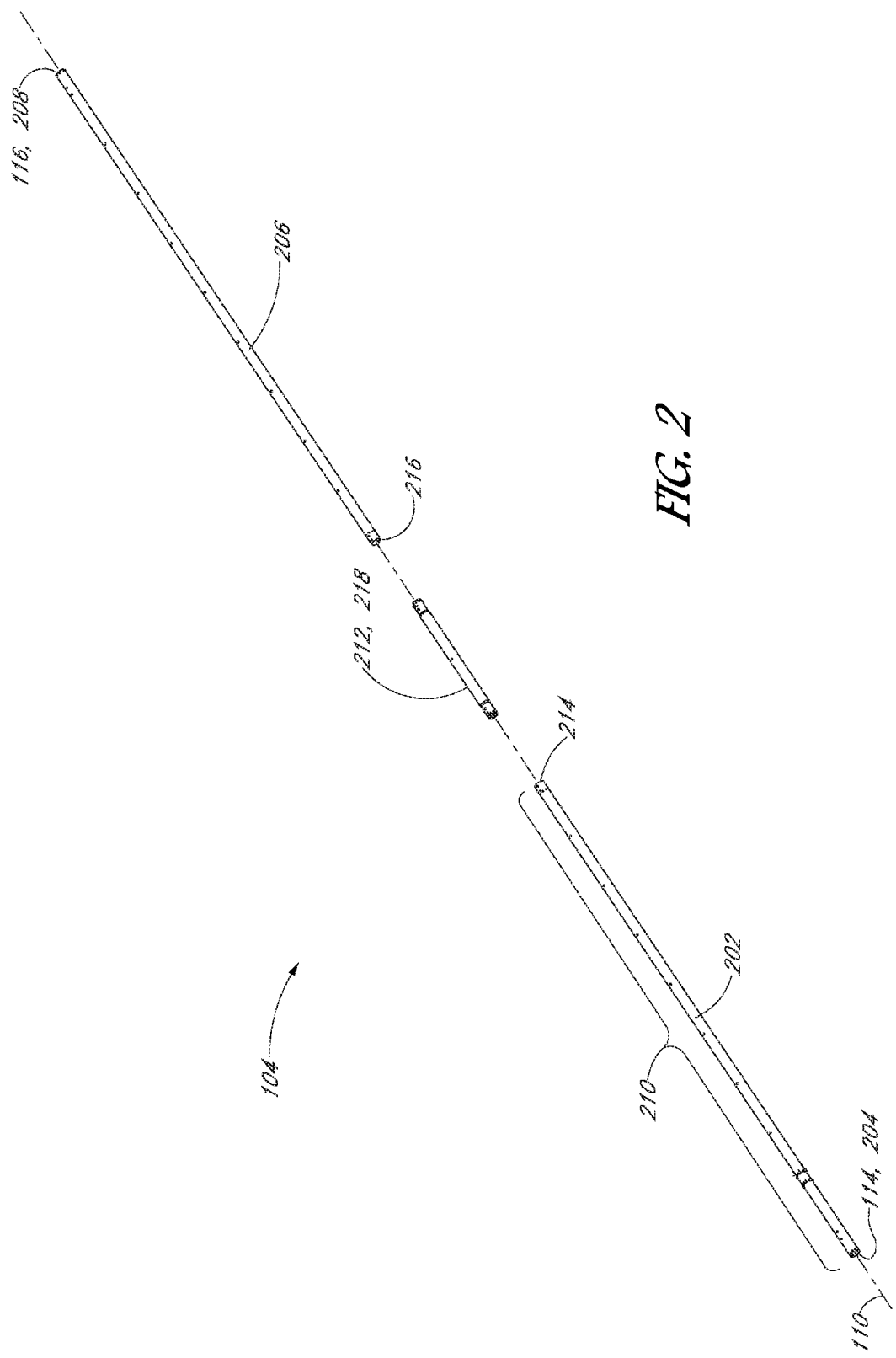
FIG. 2 illustrates an exploded perspective view of a torque tube assembly, in accordance with an embodiment of the present disclosure.

Referring to FIG. 2, an exploded perspective view of a torque tube assembly is shown in accordance with an embodiment of the present disclosure. Each driven section of torque tube 104 may be further segmented into several tube sections. For example, torque tube 104 may have at least two tubular sections between first end 114 and second end 116. More particularly, a first torque tube 202, which may be a first section of torque tube 104, may have a first driven end 204, and a second torque tube 206, which may be a second section of torque tube 104, may have a second driven end 208. PV modules 112 may be mounted on first torque tube 202 and second torque tube 206 in a same manner that PV modules 112 are mounted on a singular torque tube, i.e., a non-segmented torque tube.

In an embodiment, a length 210 of each torque tube 104 section may have a predetermined upper limit. For example, the tube sections may be no longer than a standard shipping container. Standard shipping containers may typically have lengths of forty feet. Thus, each tube section may have a length 210 less than 40 feet (12 meters), e.g., 30-39 feet (9.1-11.9 meters), to maximize a length of each tube section and to allow tube sections to be shipped to remote geographies for installation.

Whereas length 210 of the tube sections, e.g., first torque tube 202 and second torque tube 206, may be limited to less than 40 feet, an overall length of torque tube 104 between first driven end 204 and second driven end 208 may be more than 40 feet. Accordingly, the tube sections may be joined at one or more joint 212. For example, first torque tube 202 may extend along longitudinal axis 110 from first driven end 204 to a first free end 214. Similarly, second torque tube 206 may extend along longitudinal axis 110 from second driven end 208 to a second free end 216. Second free end 216 may be coupled to first free end 214 by a weld, a fastener joint, or other manners and mechanisms of joining tubes to extend an overall length of torque tube 104 beyond the individual length 210 of the respective tube sections.

Still referring to FIG. 2, first free end 214 of first torque tube 202 may be coupled to second free end 216 of second torque tube 206 by a torque tube coupler 218. Torque tube coupler 218 may be configured to join several torque tube 104 segments and may include a structure to resist loading that is particular to multi-tube joints. For example, torque tube coupler 218 may provide joint 212 having a closed wall section, as described below. By comparison, other tube-joining mechanisms having open wall sections, such as a dual-collar mechanism having two semi-cylindrical plates joined on either side of joint 212, could fail under a same bending or torsion load. Various embodiments of torque tube coupler 218 are described with respect to FIGS. 7-11 below.

Figure 3:
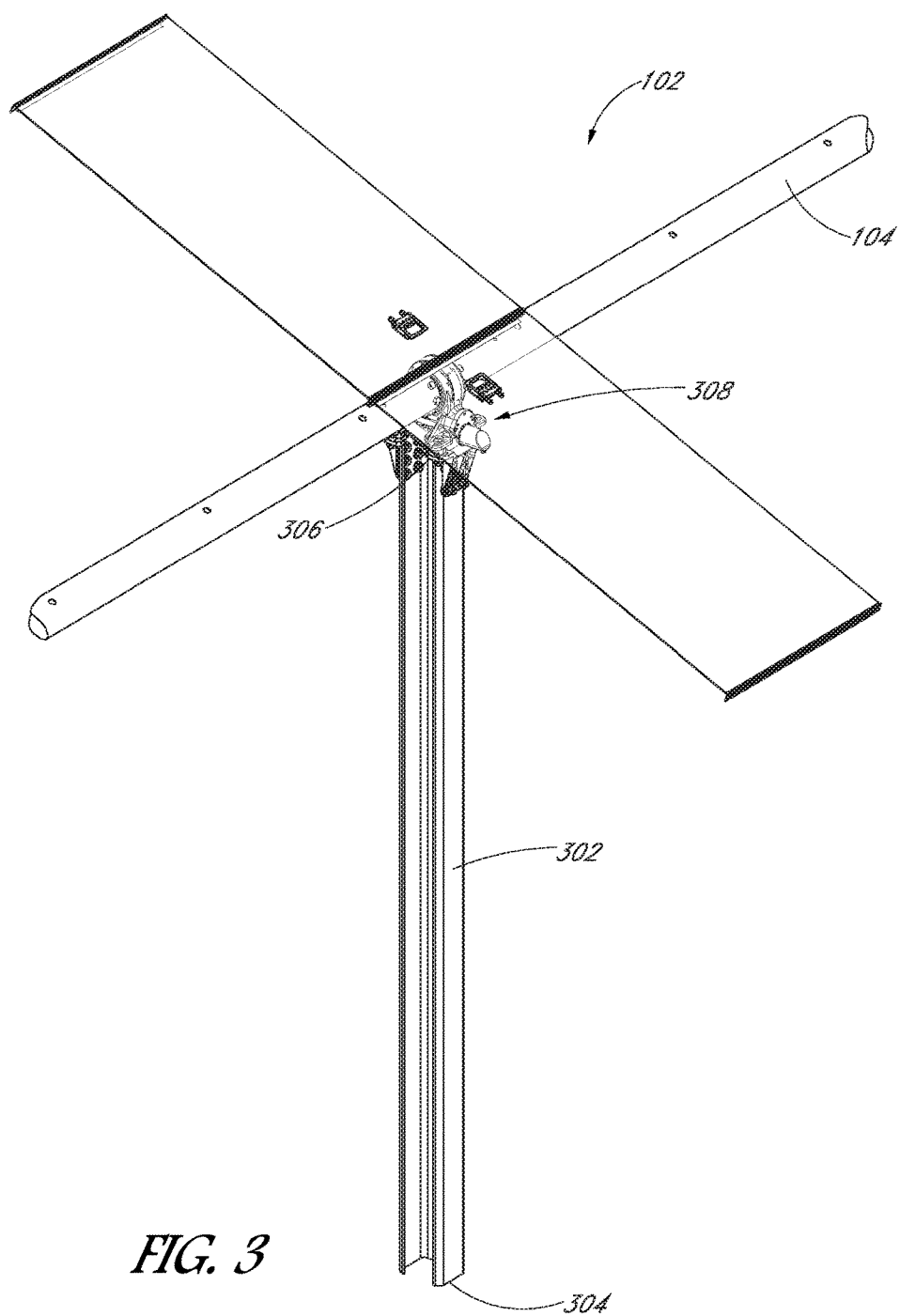
FIG. 3 illustrates a perspective view of a driven support assembly, in accordance with an embodiment of the present disclosure.

Referring to FIG. 3, a perspective view of a driven support assembly is shown in accordance with an embodiment of the present disclosure. Driven support assembly 102 shown in FIG. 3 may be representative of each driven support assembly 102 of solar-tracking PV system 100, e.g., first driven support assembly 106 and second driven support assembly 108. Each driven support assembly 102 may include a supportive stand, such as a drive pile 302. Drive pile 302 may be a columnar structure, such as an I-beam, having a lower end 304 driven into the ground, and an upper end 306 supporting an actuator configured to provide a mechanical torque to torque tube 104. More particularly, each drive pile 302 may carry a respective rotational actuator, such as a motor drive 308. An embodiment of motor drive 308 is described below with respect to FIGS. 5A-5B. Thus, first driven support assembly 106 may include a first motor drive 308, and second driven support assembly 108 may include a second motor drive 308, and the motor drives may be mounted on respective drive piles 302. Furthermore, it follows from the description above that the first motor drive 308 may be coupled to first end 114 of torque tube 104, e.g., first driven end 204 of first torque tube 202, and the second motor drive 308 may be coupled to second end 116 of torque tube 104, e.g., second driven end 208 of second torque tube 206. Accordingly, first torque tube 202 may be supported by first driven support assembly 106, and second torque tube 206 may be supported by second driven support assembly 108.

Figure 4:
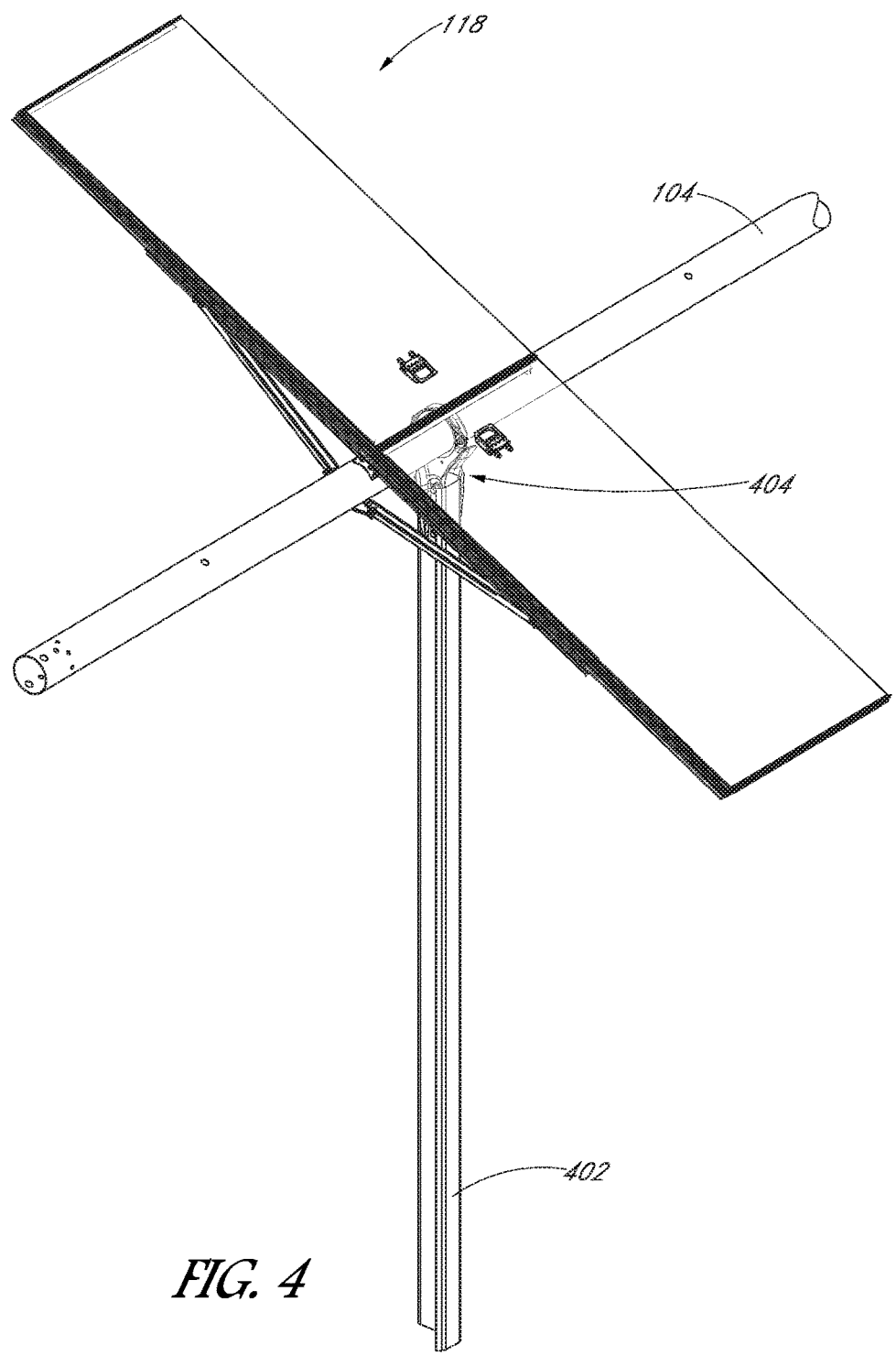
FIG. 4 illustrates a perspective view of a non-driven support assembly, in accordance with an embodiment of the present disclosure.

Referring to FIG. 4, a perspective view of a non-driven support assembly is shown in accordance with an embodiment of the present disclosure. Non-driven support assembly 118 shown in FIG. 4 may be representative of each non-driven support assembly 118 of solar-tracking PV system 100. For example, non-driven support assembly 118 may be one of several non-driven support assemblies 118 located longitudinally between first driven support assembly 106 and second driven support assembly 108. Each non-driven support assembly 118 may include a supportive stand, such as a non-drive pile 402. Non-drive pile 402 may have a similar structure to drive pile 302. For example, non-drive pile 402 may be a columnar structure such as an I-beam, or a post having a round or rectangular cross-sectional profile. The columnar structure of non-drive pile 402 may be different than drive pile 302, however. For example, non-drive pile 402 may include a different beam type including a different cross-sectional geometry having a web portion and a flange portion, e.g., a "C" or "Z" shaped profile. Each non-drive pile 402 may carry a respective supportive mechanism, such as a bearing assembly 404. An embodiment of bearing assembly 404 mounted on non-drive pile 402 is described below with respect to FIG. 6.

Drive pile 302 and non-drive pile 402 may be columnar structures other than beams having web portions and flange portions. For example, the piles 302, 402 may be tubular or solid posts. The piles 302, 402 may be symmetric or asymmetric about a vertical axis. Accordingly, piles 302, 402 may be of any elongated beam type.

Referring to FIG. 5A, a perspective view of a motor drive of a driven support assembly is shown in accordance with an embodiment of the present disclosure. Each driven support assembly 102 may include a motor drive 308 mounted on upper end 306 of drive pile 302. Motor drive 308 may be configured to convert electrical power input into a mechanical torque output. More particularly, motor drive 308 may output torque directly to a driven end, e.g., first driven end 204, of torque tube 104. Accordingly, motor drive 308 may include a gearbox 502 having an output coupling that connects directly to first driven end 204. That is, gearbox 502 may include a rotational output attached to first driven end 204 to rotate torque tube 104 about longitudinal axis 110.

In an embodiment, gearbox 502 includes a worm drive coupled to the rotational output. More particularly, gearbox 502 of motor drive 308 may include a worm gear driven by a worm (not shown). Worm drives are known in the art, and thus further description of particular worm drive configurations is not provided here. The worm gear may be mounted within a gearbox housing, and the worm gear may be arranged along longitudinal axis 110 and coupled to the rotational output to input torque to first driven end 204 of torque tube 104.

The worm of gearbox 502 may be coupled to an input actuator, such as a gearmotor 504. Gearmotor 504 may deliver torque to worm through an output shaft. Thus, electrical power input delivered to gearmotor 504 may be converted into input torque to the worm, and the input torque may be transmitted from the worm to the worm gear to output mechanical torque to first driven end 204. It will be appreciated that gearmotor 504 may be electrically coupled to controller 120, and controller 120 may manage the delivery of electrical power to gearmotor 504 to control the output torque delivered to torque tube 104.

Figure 5B:
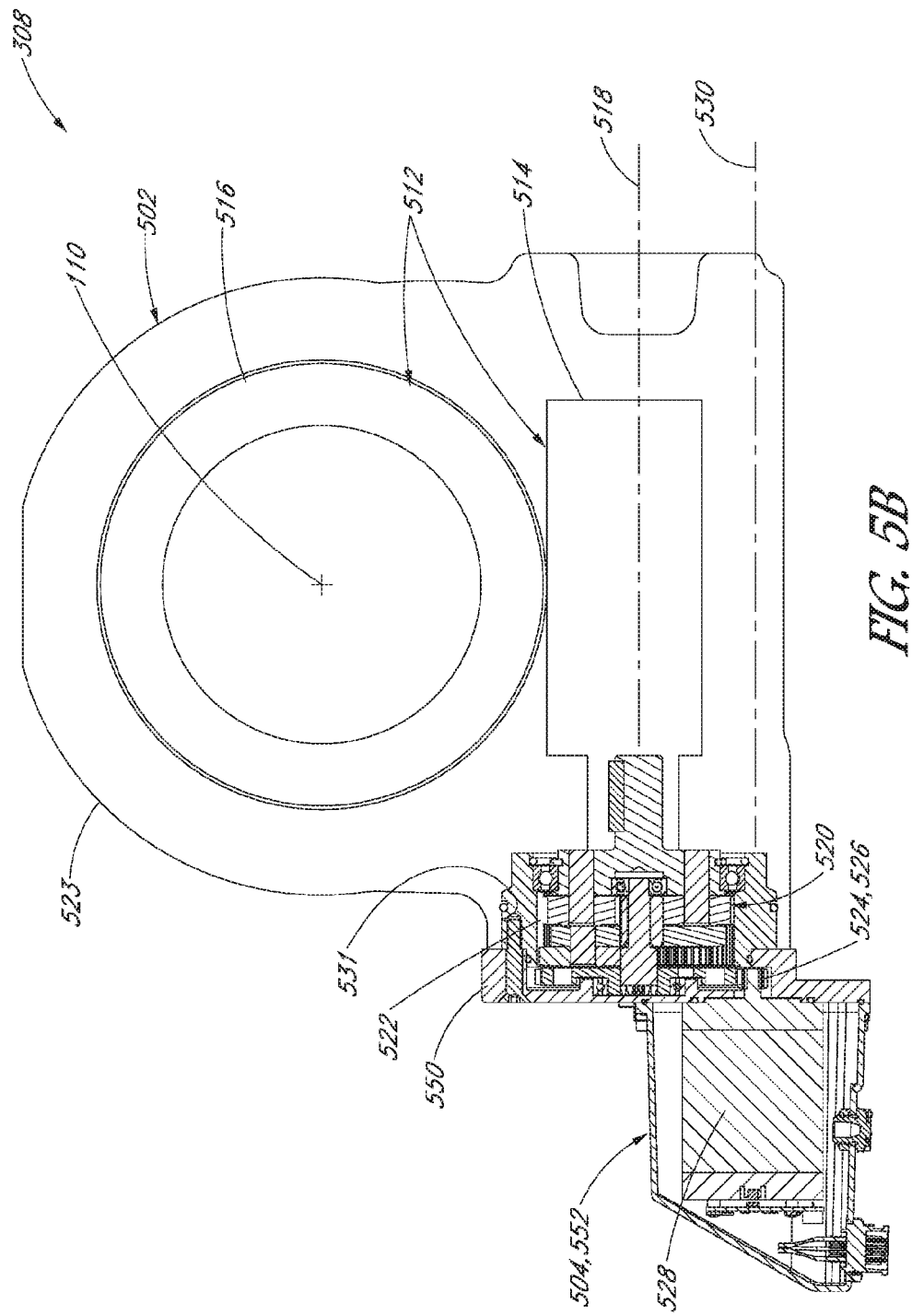
FIG. 5B illustrates a section view of a motor drive of a driven support assembly in accordance with an embodiment of the present disclosure.

Referring to FIG. 5B, a section view of a motor drive of a driven support assembly is shown in accordance with an embodiment of the present disclosure. Gearbox 502 of motor drive 308 may include a worm drive 512 to transmit power from gearmotor 504 to a torque tube coupling. More particularly, worm drive 512 may be coupled to torque tube 104 by torque tube coupling. Worm drive 512 may include a worm 514 (drawn schematically) to receive input torque from gearmotor 504, and a worm gear 516 (drawn schematically) to output transmitted torque to the torque tube coupling. Worm 514 and worm gear 516 may be constructed as is known in the art, and thus, particular description of the components is omitted in the interest of brevity. It will be appreciated, however, that worm 514 may rotate about a worm axis 518, and worm gear 516 may rotate about longitudinal axis 110. Accordingly, worm axis 518 may be below longitudinal axis 110, and correspondingly, below torque tube 104.

In an embodiment, gearmotor 208 includes a planetary gear train 520 coupled to worm 514. For example, planetary gear train 520 may be disposed within a mounting cavity 522 of a gearbox housing 523. That is, a cavity wall 531 may extend around mounting cavity 522 about worm axis 518, and an output of planetary gear train 520 may be coupled to worm 514 within mounting cavity 522. Thus, planetary gear train 520 may be supported by a housing mount 550 within mounting cavity 522 along worm axis 518.

As described below, gearmotor 504 may include an offset gear (not shown) coupled to planetary gear train 520, and coupled to a pinion gear 524 of motor assembly 552. For example, motor assembly 552 may include pinion gear 524 mounted on an output shaft 526 of a motor 528, and the offset gear may transmit mechanical power from pinion gear 524 to planetary gear train 520. The offset gear may have an internal gear portion, e.g., an internal spur gear, engaged with planetary gear train 520 about worm axis 518 and an external gear portion, e.g., an external spur gear, engaged with pinion gear 524 adjacent to shaft axis 530. Thus, the offset gear may transmit power laterally between pinion gear 524 on shaft axis 530 and planetary gear train 520 on worm axis 518.

Output shaft 526 may extend along a vertical plane, and planetary gear train 520 may extend along the vertical plane. For example, worm axis 518 and shaft axis 530 may be contained within the vertical plane, and thus planetary gear train 520 and output shaft 526 may be aligned along the same vertical plane. Furthermore, planetary gear train 520 may be vertically above shaft axis 530 within the vertical plane. Accordingly, output shaft 526 may rotate about shaft axis 530 offset below worm axis 518. For example, shaft axis 530 may be offset below worm axis 518 by a distance equal to a radius of the offset gear plus a radius of pinion gear 524. As such, the offset gear lowers motor assembly 552 relative to worm drive 512, and increases a clearance between motor assembly 406 and PV module 112 mounted on torque tube 104.

Figure 6:
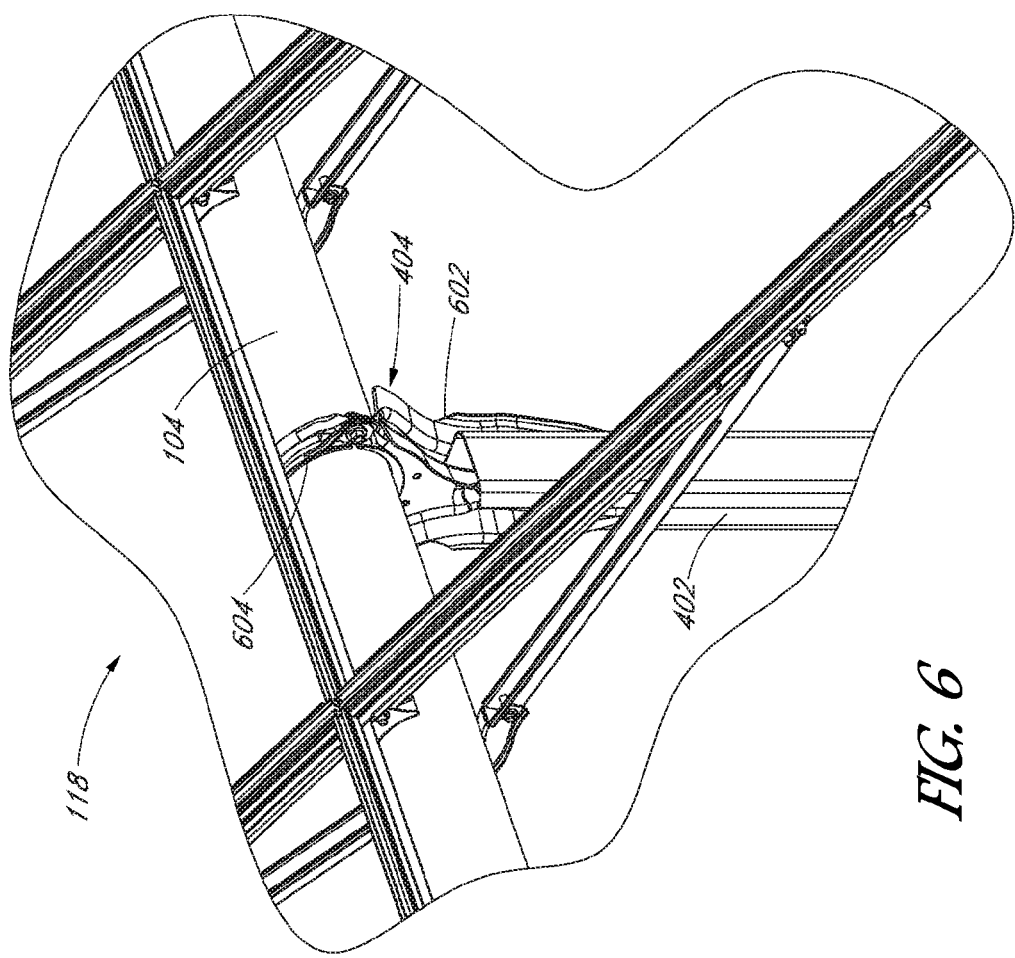
FIG. 6 illustrates a perspective view of a bearing assembly of a non-driven support assembly, in accordance with an embodiment of the present disclosure.

Referring to FIG. 6, a perspective view of a bearing assembly of a non-driven support assembly is shown in accordance with an embodiment of the present disclosure. Each non-driven support assembly 118 may include a bearing assembly 404 mounted on non-drive pile 402. Bearing assembly 404 may include a bearing housing 602 supporting a bearing 604. Furthermore, bearing 604 may extend around longitudinal axis 110 to support torque tube 104. For example, bearing 604 may have an annular structure formed from a low friction material, and torque tube 104 may extend through an inner diameter of the annular bearing 604. Thus, bearing 604 may constrain transverse movement of torque tube 104 and permit torque tube 104 to rotate about longitudinal axis 110 when motor drive 308 inputs torque to the respective driven end.

Distributing driven and non-driven support assemblies along torque tube 104 can provide several benefits. For example, the distribution of input torque at longitudinally separated locations can increase an effective system stiffness by shortening torque tube section lengths between drives, and thus, an angular deflection of torque tube 104 under a given wind loading may be minimized. The increase in effective system stiffness may also allow for a thinner torque tube 104 to be used. For example, a wall thickness of the torque tube 104 may be reduced, as compared to a single-drive system torque tube 104. Accordingly, a likelihood of wind damage may be reduced and/or larger PV modules 112 may be used for a designed wind load to increase system energy production. This may be achieved even with a lighter, less costly, torque tube. In an embodiment, torque tube 104 has a cylindrical wall with a thickness less than 0.75 cm. A diameter of torque tube 104 having such a wall thickness may be greater than 10 cm. Since the weight of torque tube 104 and PV modules 112 mounted on torque tube 104 may be distributed across more and/or more evenly spaced support assemblies, a pile size and weight of the driven support assemblies may also be reduced. Accordingly, a multi-drive solar-tracking PV system 100 may be more robust and less costly to manufacture or install, as compared to typical single-drive systems.

As described above, a dual-drive solar-tracking PV system 100 may include a torque tube 104 having several segments joined at joint 212 between adjacent driven support assemblies. Furthermore, joint 212 between torque tube 104 segments can resist bending and torsion generated by wind loading. Joint 212, for example, may include torque tube coupler 218.

Figure 7:
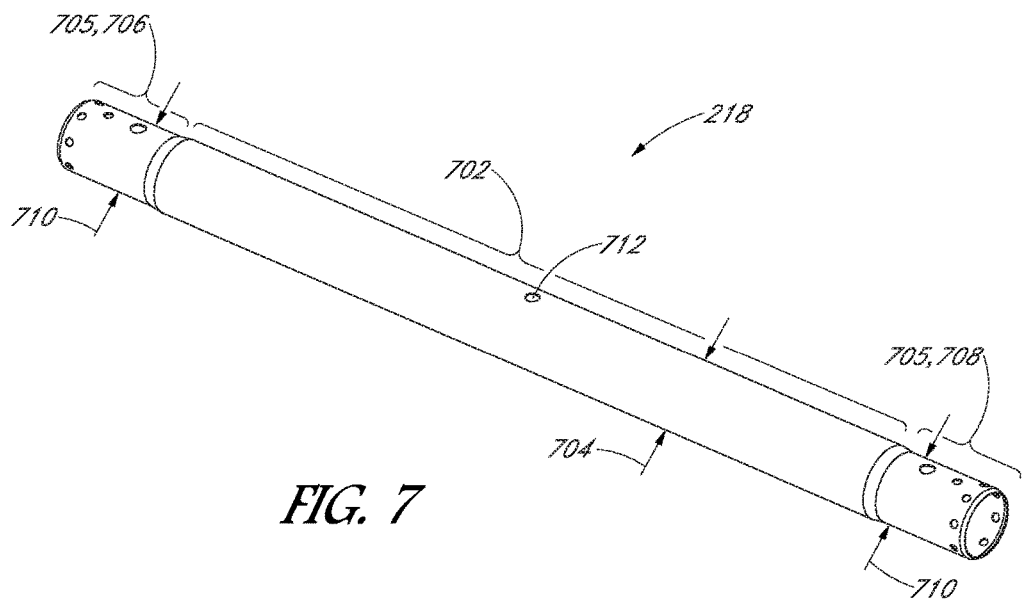
FIG. 7 illustrates a perspective view of a torque tube coupler, in accordance with an embodiment of the present disclosure.

Referring to FIG. 7, a perspective view of a torque tube coupler is shown in accordance with an embodiment of the present disclosure. Torque tube coupler 218 may have a tubular construction that includes swaged and/or expanded ends. For example, torque tube coupler 218 may include a galvanized steel tube necked end sections that fit into an inner diameter of one or more segments of torque tube 104. Torque tube coupler 218 may have a predetermined length less than length 210 of torque tube 104 sections. For example, whereas each torque tube section adjoined by torque tube coupler 218 may have an overall length in a range of 30-40 feet, e.g., 39 feet, torque tube coupler 218 may have an overall length between 4-14 feet, e.g., 9 feet.

Torque tube coupler 218 may include a medial section 702 to extend between adjacent free ends of adjoining torque tube 104 sections. In an embodiment, torque tube coupler 218 supports one or more PV modules 112, and thus, medial section 702 may have a medial outer diameter 704 that is similar to an outer diameter of torque tube 104. For example, medial outer diameter 704 and the outer diameter of torque tube 104 may be equal and in a range of 5-10 inches, e.g., 6.6 inches. Accordingly, PV frames may be mounted on torque tube coupler 218 in a same manner that is used to mount PV modules 112 on torque tube 104.

Torque tube coupler 218 may include several end sections 705 extending from opposite ends of medial section 702. For example, a first end section 706 may extend along longitudinal axis 110 to attach to an end of first torque tube 202, e.g., first free end 214, and a second end section 708 may extend along longitudinal axis 110 to attach to an end of second torque tube 206, e.g., second free end 216. Each end section 705 may include an end outer diameter 710 configured to mate with an adjoining torque tube section, as described below. Accordingly, medial section 702 may extend between first end section 706 and second end section 708, and medial outer diameter 704 may be different than end outer diameter 710. For example, medial section 702 may have a same outer diameter as torque tube 104, and the end sections 705 may have different outer diameters than torque tube 104.

Figure 8:
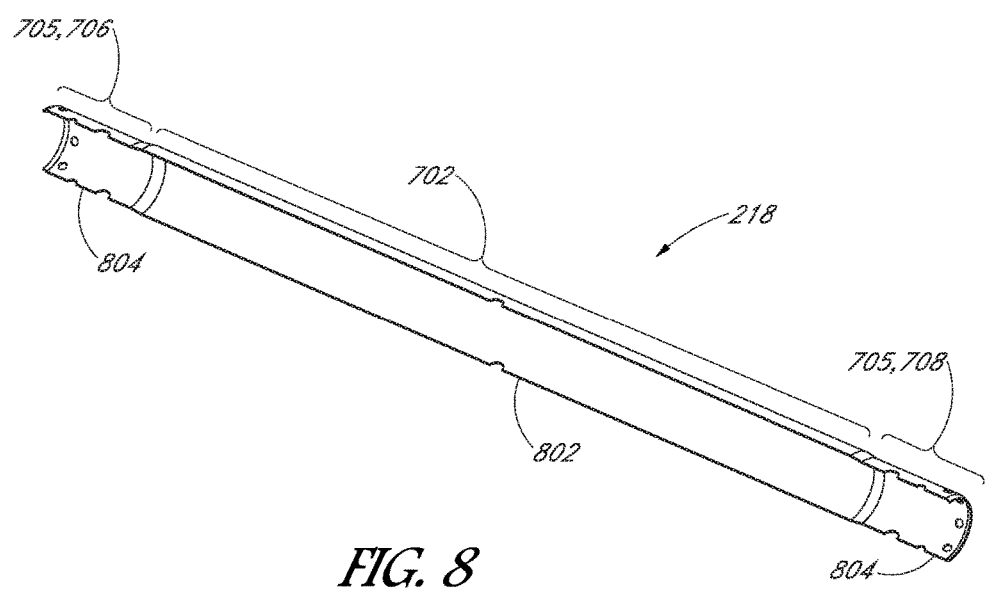
FIG. 8 illustrates a perspective section view of a torque tube coupler, in accordance with an embodiment of the present disclosure.

Referring to FIG. 8, a perspective section view of a torque tube coupler is shown in accordance with an embodiment of the present disclosure. Medial section 702 and end sections 705 of torque tube coupler 218 may have continuous walls surrounding longitudinal axis 110. For example, medial section 702 may include a medial wall 802 extending around longitudinal axis 110, and each end section 705 may include an end wall 804 extending around longitudinal axis 110. A thickness of the walls may be the same or different. For example, a wall thickness of medial wall 802 and/or end walls 804 may all be in a range of 9-11 gauge.

Figure 9:
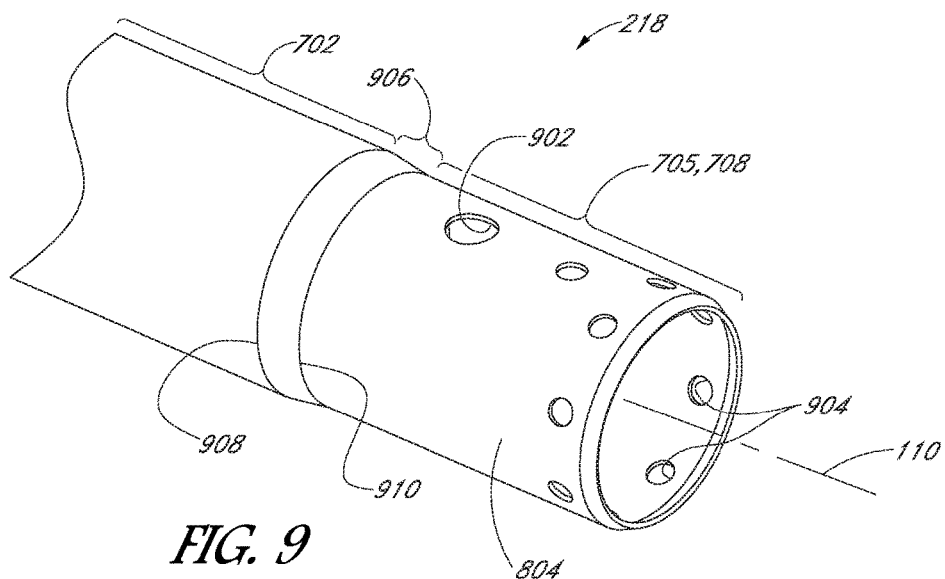
FIG. 9 illustrates a perspective view of an end section of a torque tube coupler, in accordance with an embodiment of the present disclosure.

Referring to FIG. 9, a perspective view of an end section of a torque tube coupler is shown in accordance with an embodiment of the present disclosure. Torque tube coupler 218 may include several holes in one or more sections to serve various functions in the assembly of torque tube 104. For example, medial section 702 may include a medial mounting hole 712 (FIG. 7) through medial wall 802. Medial mounting hole 712 may receive a fastener, e.g., a bolt or a rivet, to attach a PV module 112 to medial section 702. Similarly, one or more of the end sections 705, e.g., second end section 708, may include an end mounting hole 902 through end wall 804. As described below, end mounting hole 902 may receive a fastener to simultaneously attach a PV module 112 to end section 705 and torque tube 104.

In an embodiment, each end wall 804 of the end sections 705 includes several fastener holes 904. Fastener holes 904 may be distributed around a circumference of the end section 705. Fastener holes 904 may be equally spaced around the circumference along a transverse plane orthogonal to longitudinal axis 110. For example, end section 705 may include eight fastener holes 904 distributed at intervals of 45 degrees around longitudinal axis 110. Fastener holes 904 may align with mating holes in the ends of torque tube 104 sections. Thus, fasteners may be inserted through fastener holes 904 in both end section 705 and torque tube 104 to connect torque tube coupler 218 two torque tube 104.

Medial section 702 may be coupled to one or more end section 705 by a respective transition section 906. Transition section 906 may include an outer surface that transitions between an inward end 908 at medial section 702 to an outward end 910 at end section 705. Thus, transition section 906 may be coupled to medial section 702 at inward end 908 and to end section 705 at outward end 910. Outward end 910 and inward end 908 may have different outer dimensions, e.g., diameters. For example, end section 705 may be formed by swaging an end of a uniform tube, and thus, end section 705 may effectively be a necked down portion of medial section 702. Alternatively, end section 705 may be formed by expanding an end of the uniform tube, or swaging a metal portion of the uniform tube. A profile of the outer surface of transition section 906 may depend on the swaging or expansion process, and by way of example, transition section 906 may have a tapered or stepped profile. More particularly, transition section 906 may taper smoothly and continuously from a larger diameter at inward end 908 to a smaller diameter at outward end 910.

The holes of torque tube coupler 218 may have predetermined positions relative to each other. For example, medial mounting hole 712 and end mounting hole 902 may be aligned along a longitudinal plane containing longitudinal axis 110. The longitudinal plane may be a plane, for example, that bisects torque tube coupler 218 longitudinally such that the sectioned torque tube coupler 218 would appear as shown in the perspective section view of FIG. 8. As such, a PV module 112 may be mounted on torque tube coupler 218 using fasteners that are aligned in a longitudinal direction.

Figure 10:
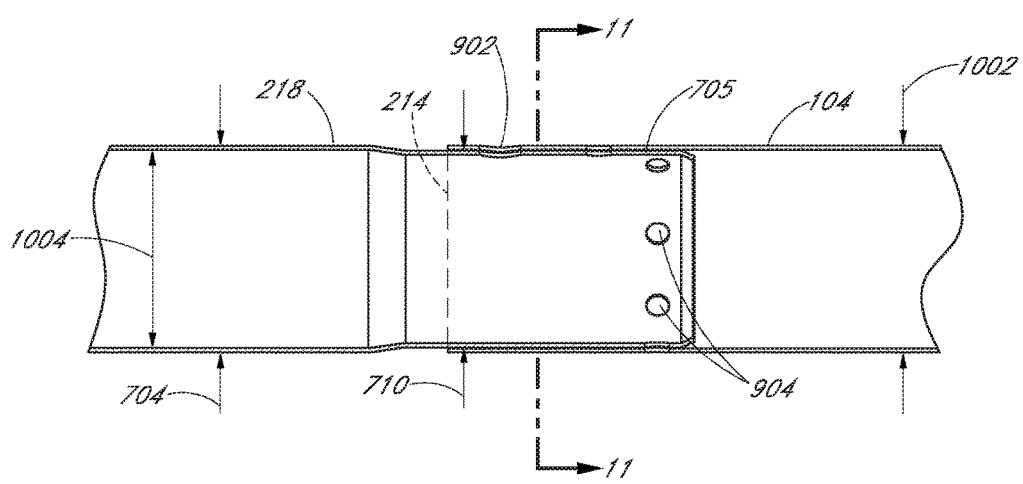
FIG. 10 illustrates a section view of a torque tube coupler joined to a torque tube, in accordance with an embodiment of the present disclosure.

Referring to FIG. 10, a section view of a torque tube coupler joined to a torque tube is shown in accordance with an embodiment of the present disclosure. End section 705 is coupled to an end of torque tube 104. For example, torque tube coupler 218 may be coupled to first free end 214 of first torque tube 202 or to second free end 216 of second torque tube 206. In an embodiment, end section 705 is inserted into the end of torque tube 104. For example, end outer diameter 710 may be less than an inner diameter of torque tube 104, allowing end section 705 to be inserted into an inner diameter of torque tube 104. Both end sections 705 of torque tube coupler 218 may be similarly fit into respective torque tube 104 sections. Thus, first torque tube 202, second torque tube 206, and torque tube coupler 218 may extend along longitudinal axis 110 and be pivotable about longitudinal axis 110. Fasteners may be disposed within mating fastener holes 904 of torque tube 104 and end section 705 to transmit torque between the tubular structures. Similarly, fasteners may be inserted through end mounting holes 902 in both end section 705 and torque tube 104 to transmit torque from the tubular structures to a PV module 112 mounted on the tubular structures.

In an embodiment, medial outer diameter 704 may be the same as a torque tube coupler 218 outer diameter 1002. PV frame may be mounted on outside surfaces of torque tube coupler 218 and torque tube 104 that are equally spaced apart (at a same radial distance) from longitudinal axis 110. As a result, PV frame may be attached to both torque tube coupler 218 and torque tube 104 using a same type of coupling. That is, by keeping the outer dimension the same along an entire length of the torque tube assembly, the need for different module attachment couplings is obviated. Thus, a PV module 112 may be mounted on both torque tube coupler 218 and an adjacent torque tube 104, e.g., second torque tube 206, using the same mounting hardware.

Torque tube coupler 218 and torque tube 104 may have similar wall thicknesses, and thus, end outer diameter 710, which may be the same diameter as outward end 910 of transition section 906, may be less than a medial inner diameter 1004 of medial section 702. More particularly, when medial section 702 and torque tube 104 have a same wall thickness, it follows that for an outer diameter of end section 705 to fit within torque tube 104, end outer diameter 710 is less than both the inner diameter of torque tube 104 and medial inner diameter 1004.

Figure 11:
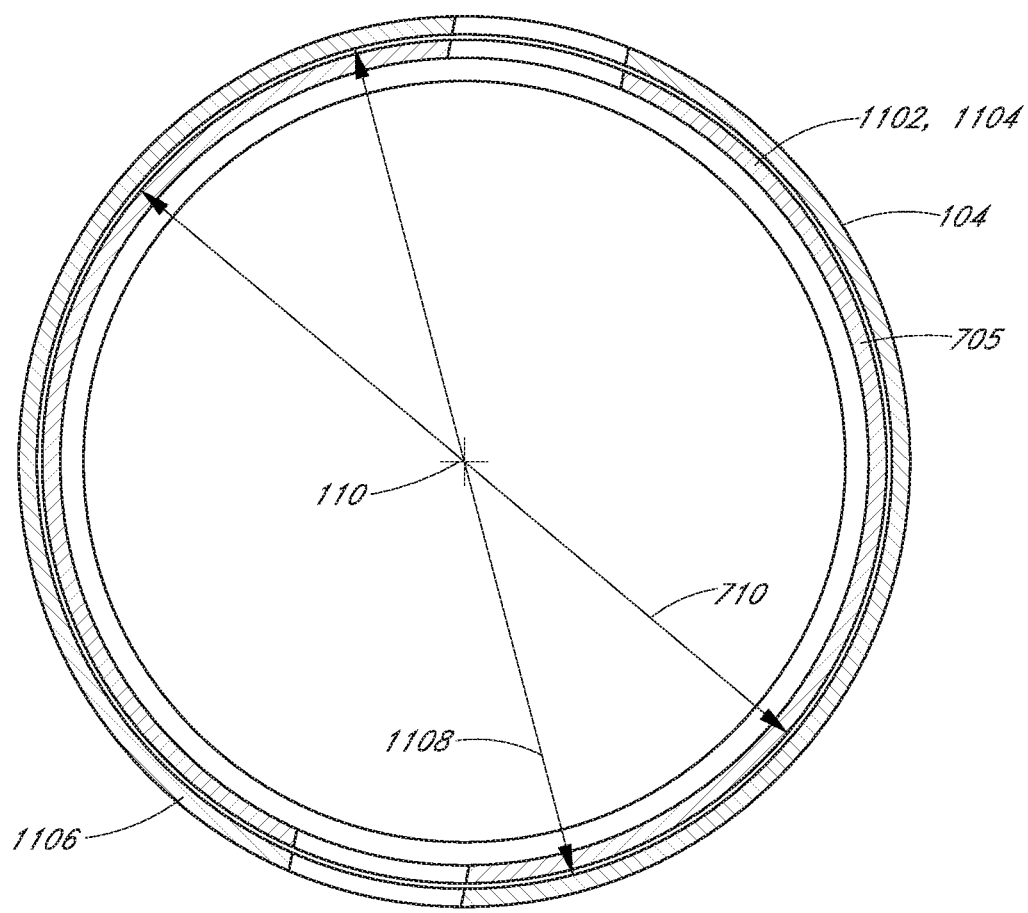
FIG. 11 illustrates a section view, taken about line 11-11 of FIG. 10, of a torque tube coupler joined to a torque tube, in accordance with an embodiment of the present disclosure.

Referring to FIG. 11, a section view, taken about line 11-11 of FIG. 10, of a torque tube coupler joined to a torque tube is shown in accordance with an embodiment of the present disclosure. End sections 705 of torque tube coupler 218 and mating portions of the torque tubes 104, e.g., the free ends of first torque tube 202 and second torque tube 206, may include respective cross-sectional areas of closed wall sections 1102. For example, the closed wall sections 1102 may have cross-sectional areas that are annular. By way of example, first end section 706 of torque tube coupler 218 may include a coupler cross-sectional area 1104. Similarly, by way of example, first torque tube 202 may include a corresponding tube cross-sectional area 1106 at first free end 214. That is, coupler cross-sectional area 1104 and tube cross-sectional area 1106 may be concentrically disposed about longitudinal axis 110.

The concentric annular cross-sectional areas of end section 705 and torque tube 104 may have dimensions corresponding to an assembled configuration in which end section 705 inserts into torque tube 104, or in which end section 705 fits around an outside of torque tube 104. For example, when end sections 705 are swaged to a smaller size than medial section 702, end sections 705 include respective outer diameters that are less than respective inner diameters of the concentric annular cross-sectional areas of the torque tube 104 ends. That is, end outer diameter 710 may be less than a tube inner diameter 1108 of tube cross-sectional area 1106.

In an embodiment, end section 705 may fit around torque tube 104. For example, end sections 705 may be flared outward to fit around an outer diameter 1002 of tube cross-sectional area 1106. It will be appreciated that in such case the annular cross-sectional areas of the end sections 705 include respective inner diameters, i.e., end inner diameters 1108, greater than respective outer diameters 1002 of the concentric annular cross-sectional areas of the torque tube 104 ends. Accordingly, various torque tube coupler 218 configurations may be used to interconnect torque tube 104 sections while maintaining a uniform outer diameter for torque tube assembly and effectively transmitting torque from first torque tube 202 to second torque tube 206 through torque tube coupler 218.

As described above, a single controller 120 may control several motor drives 308. For example, controller 120 may be electrically connected to a first motor drive 308 attached to first driven end 204 of first torque tube 202, and controller 120 may be electrically connected to a second motor drive 308 attached to second driven end 208 of second torque tube 206. Accordingly, the gearmotors 504 of the respective motor drives 308 may be controlled by controller 120 to input power to a singular torque tube 104 and/or a torque tube assembly.

Controller 120 may simultaneously control the pair of motor drives 308 by controlling the delivery of electrical power to the gearmotors 504 to achieve a desired torque at the longitudinally separated input locations on torque tube 104. More particularly, controller 120 may independently control the motor drives 308 to input a same or a different torque at each end of the torque tube 104.

Figure 12:
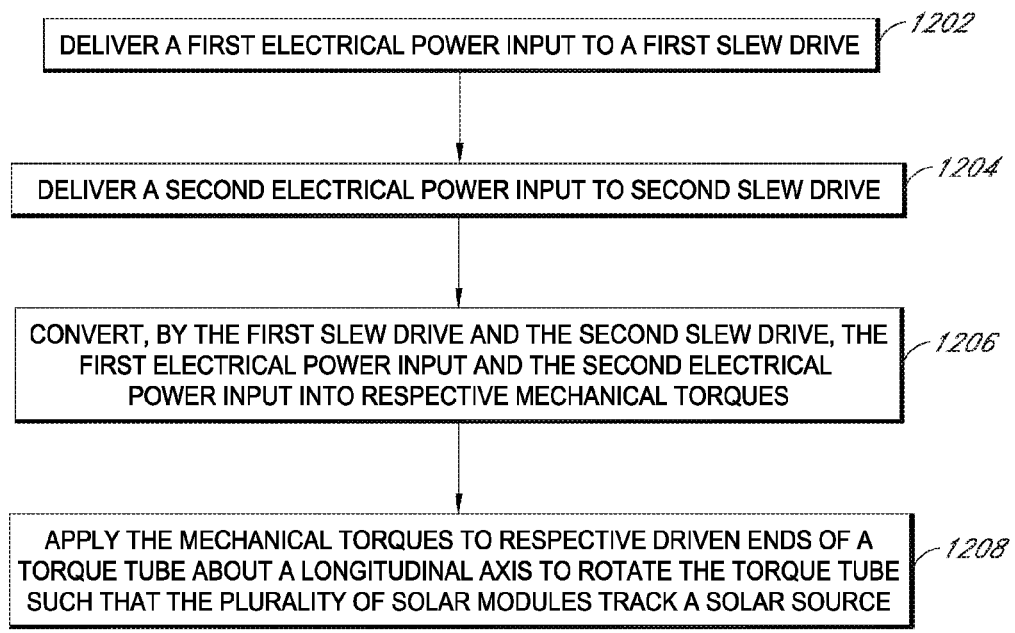
FIGS. 12-14 illustrate flowcharts of various methods of operating a multi-drive solar-tracking PV system, in accordance with an embodiment of the present disclosure.

Referring to FIG. 12, a flowchart of various methods of operating a multi-drive solar-tracking PV system 100, is shown in accordance with an embodiment of the present disclosure. At operation 1202, a first electrical power input 122 may be delivered to a first motor drive 308. More particularly, electrical power may be delivered to a gearmotor 504 of first motor drive 308. Similarly, at operation 1204, a second electrical power input 124 may be delivered to a second motor drive 308. More particularly, electrical power may be delivered to a gearmotor 504 of second motor drive 308. At operation 1206, the independently delivered first electrical power input 122 and second electrical power input 124 may be converted by the respective motor drives 308 into respective mechanical torques. That is, gearmotor 504 of the motor drive 308 may convert the electrical power input to a mechanical torque at an output shaft, and the output mechanical power may be transmitted to the worm gear of the gearbox 502 and the output of the motor drive 308. For example, when first electrical power input 122 is equal to second electrical power input 124, and assuming identical efficiencies of the pair of motor drives 308, an identical torque may be generated at the output of the first motor drive 308 and the output of the second motor drive 308. At operation 1208, the mechanical torques generated by the pair of motor drives 308 may be applied to respective driven ends of torque tube 104. Thus, torque tube 104 of multi-drive solar-tracking PV system 100 may rotate about longitudinal axis 110 such that solar modules track the solar source.

Figure 13:
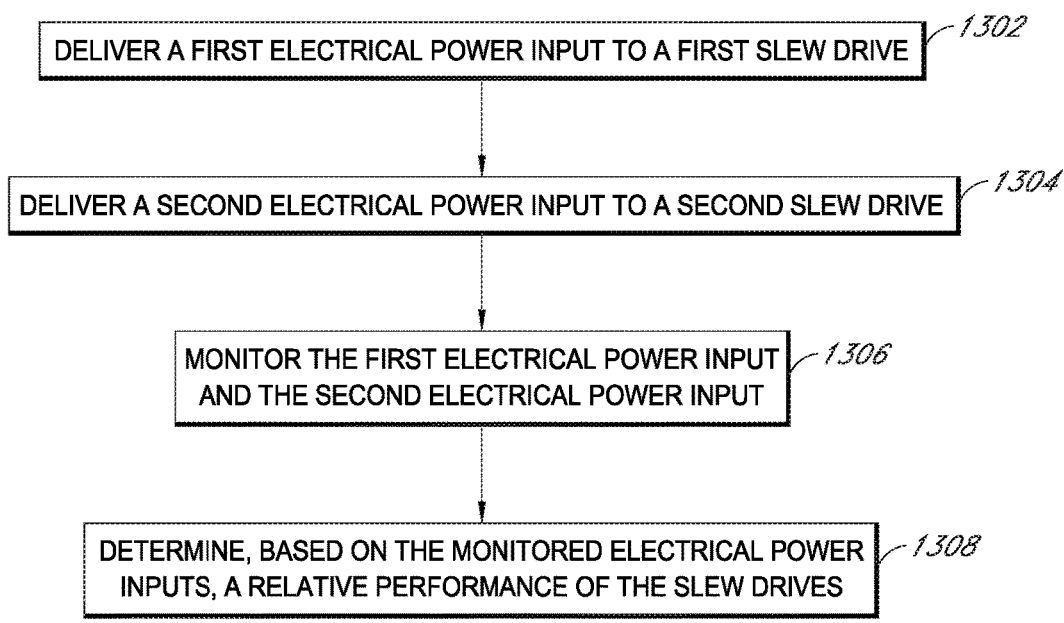

Referring to FIG. 13, a flowchart of various methods of operating a multi-drive solar-tracking PV system, is shown in accordance with an embodiment of the present disclosure. Controller 120 may be a "smart" controller configured to diagnose efficiencies in the motor drives 308. At operations 1302 and 1304, first electrical power may be input to the first motor drive 308, and second electrical power may be input to the second motor drive 308. The motor drives 308 may include power transmission components such as gearmotor 504, which may be a stepper motor, and gearbox 502, which may essentially be a gearbox including a worm drive. Since the power transmission components may have a known efficiency, e.g., a design efficiency or an experimentally determined efficiency, an electrical power input requirement to achieve a predetermined torque or movement of torque tube 104 may be determined. At operation 1306, first electrical power input 122 and second electrical power input 124 may be monitored. For example, controller 120 may servo a power supply and/or directly measure the electrical power being delivered to the motor drives 308 to determine the electrical power input values. System characteristics may be derived from the electrical power input data gathered through the monitoring.

Other feedback signals may be collected by the controller 120 to determine motor drive 308 performance. For example, in addition to sensing electrical power input to the motor drives 308, controller 120 may receive feedback from sensors that monitor torque applied by wind, wind speed and direction, and misalignment of system components. Any characteristic relevant to system performance or efficiency may be sensed, and corresponding sensor data may be provided to controller 120.

At operation 1308, a relative performance of the motor drives 308 may be determined based on the monitored system characteristics, e.g., the electrical power inputs. For example, when the required electrical input to achieve a predetermined torque exceeds a threshold value, it may be determined that there is a problem with the motor drives 308. For example, the stepper motor of gearmotor 504 and/or gears within gearbox 502 may be failing. Such a diagnosis may be made through comparison between first electrical power input 122 and second electrical power input 124. For example, when the first motor drive 308 demands more electrical power than the second motor drive 308 to achieve a predetermined torque, it may be determined that a component of the first motor drive 308 is failing. Thus, a relative performance of the motor drives 308 may be determined to trigger a system maintenance procedure. Other system issues that may be determined by monitoring and comparing required motor power includes: identifying a stalled motor, identifying a presence of tracker obstructions, identifying a gearbox failure, identifying an electrical circuit interruption, e.g., in an electrical power line between controller 120 and the motor drive 308, and identifying possible misalignment or drift between motor drives 308.

Figure 14:
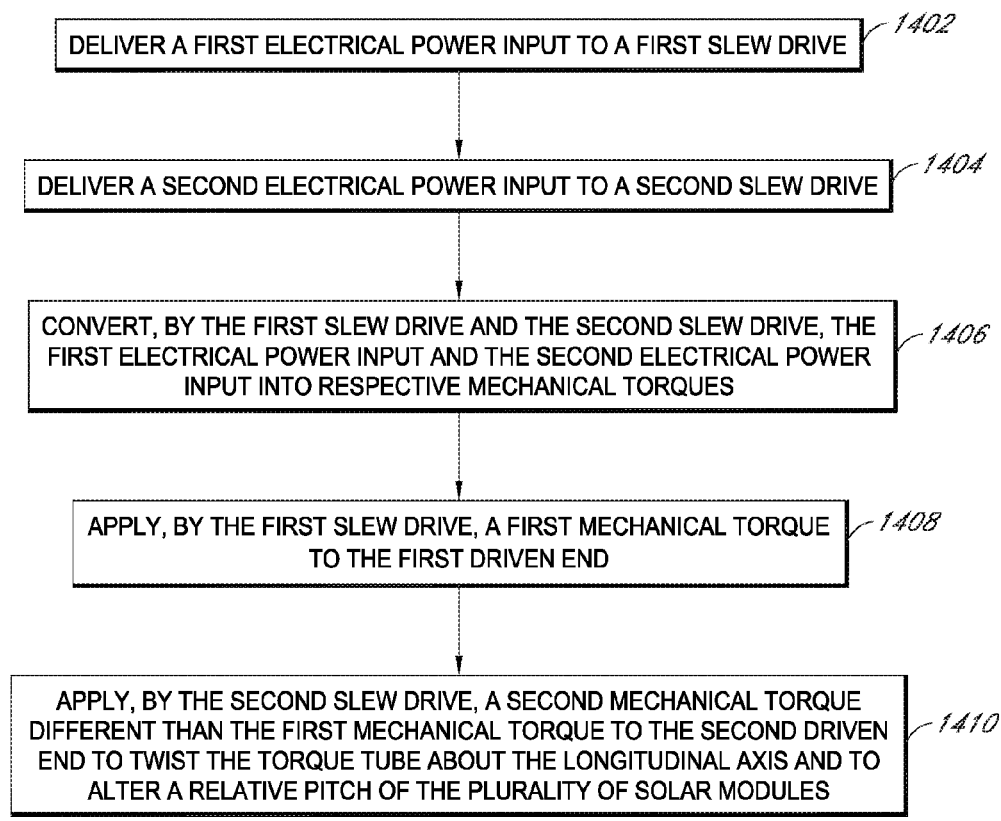

Referring to FIG. 14, a flowchart of various methods of operating a multi-drive solar-tracking PV system, is shown in accordance with an embodiment of the present disclosure. In an embodiment, controller 120 independently controls the motor drives 308 to input different torques to opposite ends of torque tube 104. At operations 1402 and 1404, first electrical power may be input to the first motor drive 308, and second electrical power may be input to the second motor drive 308. In an embodiment, first electrical power input 122 is different than second electrical power input 124. At operation 1406, the different electrical power inputs are converted by the motor drives 308 into respective mechanical torques. For example, a torque generated at an output shaft of the gearmotor 504 of the first motor drive 308 may differ from a torque generated at an output shaft of the gearmotor 504 of the second motor drive 308. The difference in torque may be proportional to the difference in electrical power input to the gearmotors 504. The different output shaft torques may be transmitted through the motor drives 308. Thus, at operation 1408, a first mechanical torque may be applied by the first motor drive 308 to first driven end and a first torque tube 202. Similarly, at operation 1410, a second mechanical torque, different than the first mechanical torque, may be applied by second motor drive 308 to second driven end 208 of second torque tube 206. The independently controlled motor drives 308 may therefore input different torques to first end 114 and second end 116 of torque tube 104. As a result, a net torsion may be applied to torque tube 104 to twist torque tube 104 between first end 114 and second end 116. As torque tube 104 twists, a relative pitch of PV modules 112 mounted on torque tube 104 may be altered. For example, whereas the front surfaces of several PV modules 112 mounted on torque tube 104 may be parallel when torque tube 104 has no net torsion, twisting of torque tube 104 may rotate respective mounting points of the PV modules 112 about longitudinal axis 110 such that the front surfaces are no longer parallel when torque tube 104 is twisted.

A net torsion may be introduced into torque tube 104 either by applying different torques to first end 114 and second end 116 in a same direction, or by applying torques in opposite directions at first end 114 and second end 116. Twisting torque tube 104 as described above may be used to achieve several functional advantages. For example, changing the pitch of PV modules 112 relative to each other may change wind dynamics such that less wind drag is applied to the entire PV system, and thus, a likelihood of system failure under wind loading may be reduced. Also, altering the pitch of PV modules 112 may prevent shading of one PV laminate by another PV laminate. For example, moving the other PV laminate may shift the shading profile to reduce a total amount of shading and increase a solar energy collection of the system.

A solar-tracking PV system including a torque tube assembly having several segments coupled by a torque tube coupler has been described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar-tracking photovoltaic (PV) system, comprising:
   a driven support assembly including a motor drive mounted on a drive pile;
   a first torque tube extending along a longitudinal axis between a first driven end and a first free end, wherein the motor drive is coupled to the first driven end to rotate the torque tube about the longitudinal axis;
   a torque tube coupler extending along the longitudinal axis between a first end section and a second end section, wherein the first end section is coupled to the first free end, wherein the torque tube coupler comprises a medial section between the first end section and the second end section, wherein the medial section has a diameter greater than a diameter of the first and second end sections, and wherein the diameter of the medial section is approximately the same as a diameter of the first torque tube;
   a second torque tube extending along the longitudinal axis, wherein the second torque tube includes a second free end coupled to the second end section; and
   a solar module mounted on the second torque tube and the torque tube coupler.

2. The solar-tracking PV system of claim 1 further comprising a non-driven support assembly including a bearing assembly mounted on a non-drive pile, wherein the second torque tube is supported by the non-driven support assembly.

3. The solar-tracking PV system of claim 1, wherein the first end section of the torque tube coupler includes a coupler cross-sectional area, wherein the first torque tube includes a tube cross-sectional area at the first free end, and wherein the coupler cross-sectional area and the tube cross-sectional area are concentric.

4. The solar-tracking PV system of claim 3, wherein the coupler cross-sectional area and the tube cross-sectional area are annular.

5. The solar-tracking PV system of claim 4, wherein an outer diameter of the coupler cross-sectional area is less than an inner diameter of the tube cross-sectional area.

6. The solar-tracking PV system of claim 4, wherein an inner diameter of the coupler cross-sectional area is greater than an outer diameter of the tube cross-sectional area.

7. The solar-tracking PV system of claim 1, wherein the torque tube coupler includes a medial section extending between the first end section and the second end section, and wherein the medial section has a same outer diameter as the torque tubes.

* * * * *